US010781702B2

United States Patent
Theertham et al.

(10) Patent No.: US 10,781,702 B2
(45) Date of Patent: Sep. 22, 2020

(54) FAN SPACER FOR A GAS TURBINE ENGINE

(71) Applicant: United Technologies Corporation, Farmington, CT (US)

(72) Inventors: Arun K. Theertham, Rocky Hill, CT (US); Peter Karkos, Ivoryton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 67 days.

(21) Appl. No.: 15/915,379

(22) Filed: Mar. 8, 2018

(65) Prior Publication Data

US 2019/0277145 A1 Sep. 12, 2019

(51) Int. Cl.
| | |
|---|---|
| *F01D 5/30* | (2006.01) |
| *F01D 5/02* | (2006.01) |
| *F02K 3/06* | (2006.01) |
| *F04D 19/00* | (2006.01) |
| *F01D 11/00* | (2006.01) |

(52) U.S. Cl.
CPC ............... *F01D 5/30* (2013.01); *F01D 5/025* (2013.01); *F01D 11/008* (2013.01); *F02K 3/06* (2013.01); *F04D 19/002* (2013.01); *F05D 2220/323* (2013.01); *F05D 2220/3212* (2013.01); *F05D 2220/36* (2013.01); *F05D 2240/80* (2013.01); *F05D 2300/121* (2013.01); *F05D 2300/133* (2013.01); *F05D 2300/603* (2013.01)

(58) Field of Classification Search
CPC ...... F01D 11/006; F01D 11/008; F01D 5/025; F01D 5/30; F01D 5/3007; F01D 5/323; F04D 19/002; F04D 29/34; F04D 29/646; F05D 2240/80; F05D 2300/121; F05D 2300/133; F05D 2300/603
See application file for complete search history.

(56) References Cited

U.S. PATENT DOCUMENTS

| | | | |
|---|---|---|---|
| 5,281,096 A | * | 1/1994 | Harris .................. F01D 11/008 416/193 A |
| 8,435,007 B2 | | 5/2013 | Morrison |
| 8,449,260 B2 | | 5/2013 | Xie et al. |
| 9,103,219 B2 | | 8/2015 | Beaujard et al. |
| 9,759,226 B2 | | 9/2017 | Duelm et al. |

(Continued)

FOREIGN PATENT DOCUMENTS

| | | |
|---|---|---|
| EP | 3489463 | 5/2019 |
| FR | 3021693 | 12/2015 |

(Continued)

OTHER PUBLICATIONS

The Extended European Search Report for EP Application No. 19161746.3, dated Jun. 26, 2019.

*Primary Examiner* — Brian P Wolcott
*Assistant Examiner* — Elton K Wong
(74) *Attorney, Agent, or Firm* — Carlson, Gaskey & Olds, P.C.

(57) ABSTRACT

A multi-piece fan spacer for a gas turbine engine includes at least one lug comprising a platform portion, a connection portion radially inward of the platform portion, and a support connecting the platform portion to the connection portion. The multi-piece fan spacer includes a plurality of platforms. Each of the platforms is connected to at least one axially adjacent platform portion.

14 Claims, 4 Drawing Sheets

(56) References Cited

U.S. PATENT DOCUMENTS

| | | | |
|---|---|---|---|
| 2008/0159866 A1* | 7/2008 | Evans | F01D 5/323 |
| | | | 416/193 A |
| 2008/0226458 A1 | 9/2008 | Pierrot et al. | |
| 2009/0208335 A1* | 8/2009 | Bottome | F01D 11/008 |
| | | | 416/179 |
| 2016/0076388 A1* | 3/2016 | Robertson | F01D 11/008 |
| | | | 416/230 |

FOREIGN PATENT DOCUMENTS

| WO | 2015088680 | 6/2015 |
|---|---|---|
| WO | 2017209963 | 12/2017 |

\* cited by examiner

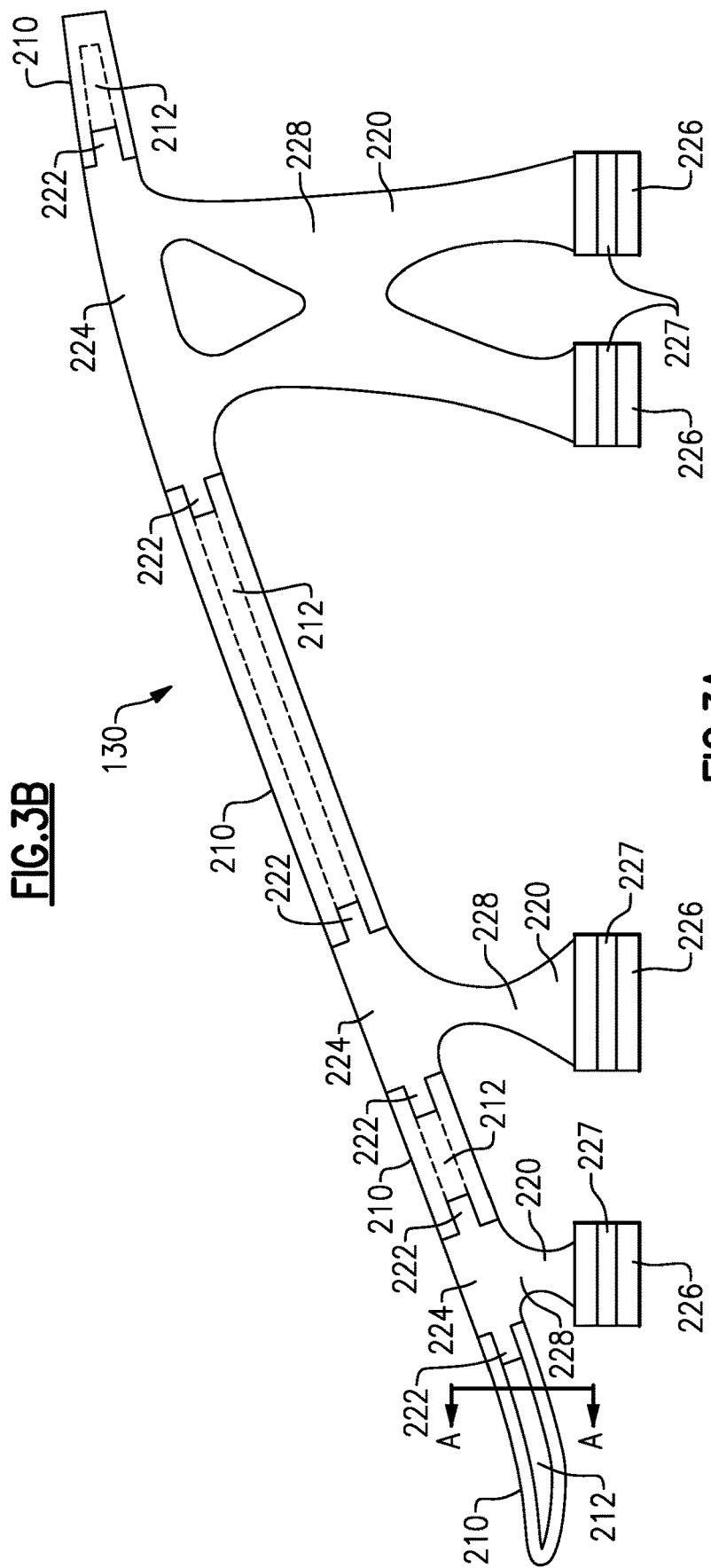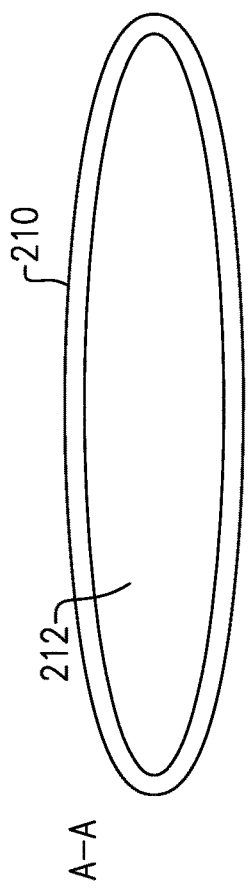

FAN SPACER FOR A GAS TURBINE ENGINE

TECHNICAL FIELD

The present disclosure relates generally to fan structures for gas turbine engines, and more specifically to a platform spacer construction for the same.

BACKGROUND

Gas turbine engines include a compressor that compresses ambient air, and provides the compressed air to a combustor. The compressed air is mixed with a fuel in the combustor and the air-fuel mixture is ignited. The resultant combustion products are passed through a turbine and are expanded across the turbine. The expansion of the combustion products drives the turbine to rotate. The rotation of the turbine, in turn, drives rotation of a shaft that is connected to the compressor section and to a fan. Rotation of the fan drives air through a bypass flowpath, allowing for the generation of thrust to propel the aircraft.

A typical fan for a gas turbine engine includes multiple blades protruding radially from a fan hub. The blades include an aerodynamic profile, and rotation of the fan draws ambient air into a bypass passage and into an engine core containing the compressor, combustor, and turbine.

SUMMARY OF THE INVENTION

In one exemplary embodiment a multi-piece fan spacer for a gas turbine engine includes at least one lug comprising a platform portion, a connection portion radially inward of the platform portion, and a support connecting the platform portion to the connection portion, and a plurality of platforms, each of the platforms being connected to at least one axially adjacent platform portion.

In another example of the above described multi-piece fan spacer for a gas turbine engine each of the lugs is a single material distinct from a material of the plurality of platforms.

In another example of any of the above described multi-piece fan spacers for a gas turbine engine each at least one lug is the same non-composite material.

In another example of any of the above described multi-piece fan spacers for a gas turbine engine the non-composite material comprises one of aluminum and titanium.

In another example of any of the above described multi-piece fan spacers for a gas turbine engine each platform in the plurality of platforms comprises a laminate material structure.

In another example of any of the above described multi-piece fan spacers for a gas turbine engine each platform comprises an internal void extending at least a substantial majority of an axial length of the platform.

In another example of any of the above described multi-piece fan spacers for a gas turbine engine the internal void of each platform is at least partially filled, and a fill material is distinct from the laminate material.

In another example of any of the above described multi-piece fan spacers for a gas turbine engine each platform portion includes at least one axially extending post, the at least one axially extending post being received in a void of an adjacent platform.

Another example of any of the above described multi-piece fan spacers for a gas turbine engine further includes an adhesive bond connecting a surface of the at least one axially extending post to an interior surface of the void.

Another example of any of the above described multi-piece fan spacers for a gas turbine engine further includes a carbon fiber wrap disposed about an exterior surface of the lug and the plurality of platforms.

In another example of any of the above described multi-piece fan spacers for a gas turbine engine the carbon fiber wrap maintains a relative position of each of the lug and the plurality of platforms.

In another example of any of the above described multi-piece fan spacers for a gas turbine engine the connection portion comprises a plurality of axially oriented holes configured to receive a single fastener rod.

In another example of any of the above described multi-piece fan spacers for a gas turbine engine the at least one lug comprises a plurality of lugs.

In one exemplary embodiment a gas turbine engine includes an engine core including a compressor, a combustor and a turbine, a fan section forward of the engine core, the fan section including a fan hub, a plurality of fan blade platforms mounted to the hub, and a plurality of spacer platforms disposed between the fan blade platforms, and wherein each of the spacer platforms includes at least one lug comprising a platform portion, a connection portion radially inward of the platform portion, and a support connecting the platform portion to the connection portion and a plurality of platforms, each of the platforms being connected to at least one axially adjacent platform portion.

In another example of the above described gas turbine engine each platform in the plurality of platforms comprises a laminate material structure and defines an internal void extending at least a substantial majority of an axial length of the platform.

In another example of any of the above described gas turbine engines the at least one lug comprises a post extending into the internal void of an adjacent platform.

Another example of any of the above described gas turbine engines further includes an adhesive bond between an internal surface of the internal void and the corresponding post.

In another example of any of the above described gas turbine engines each of the spacer platforms is a carbon fiber laminate material and each of the lugs is a solid material.

An exemplary method for assembly of a fan section of a gas turbine engine includes disposing at least a first spacer platform between adjacent fan blade platforms, wherein the at least a first spacer platform comprises at least one lug including a platform portion, a connection portion radially inward of the platform portion, and a support connecting the platform portion to the connection portion and a plurality of platforms, each of the platforms being connected to at least one axially adjacent platform portion.

Another example of the above described exemplary method for assembly of a fan section further includes connecting the at least one spacer platform to a fan engine hub by passing a rod through each of the connection portions and at least one corresponding connection feature of the hub.

These and other features of the present invention can be best understood from the following specification and drawings, the following of which is a brief description.

BRIEF DESCRIPTION OF THE DRAWINGS

FIG. 3A schematically illustrates an exemplary axial cross section of a fan spacer.

FIG. 3B schematically illustrates an exemplary radial cross section of the fan spacer of FIG. 3A along cross section A-A.

DETAILED DESCRIPTION OF AN EMBODIMENT

Figure 1:
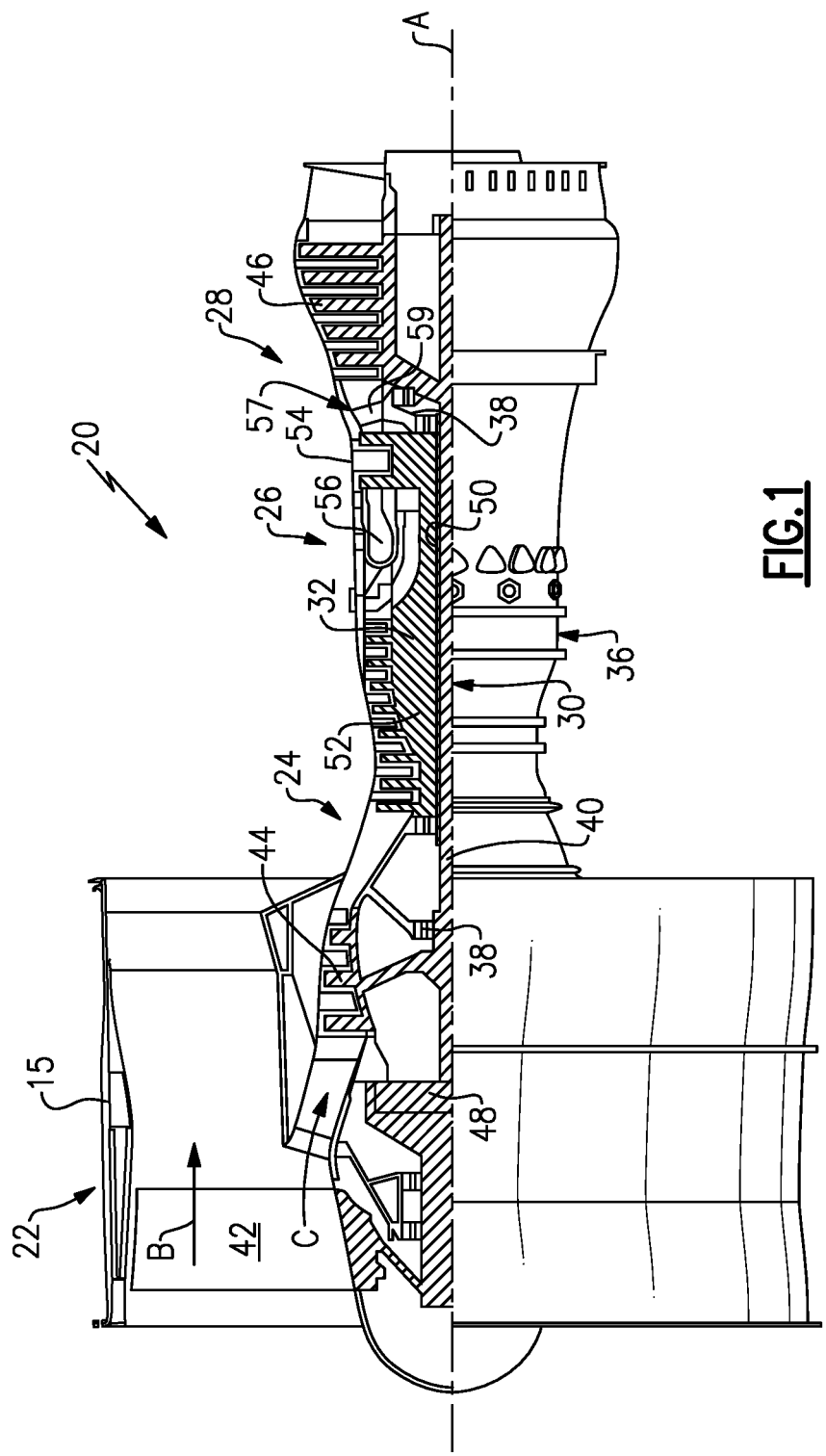
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram °R})/(518.7°\text{R})]^{0.5}$. The "Low corrected fan tip speed" as disclosed herein according to one non-limiting embodiment is less than about 1150 ft/second (350.5 meters/second).

Figure 2:
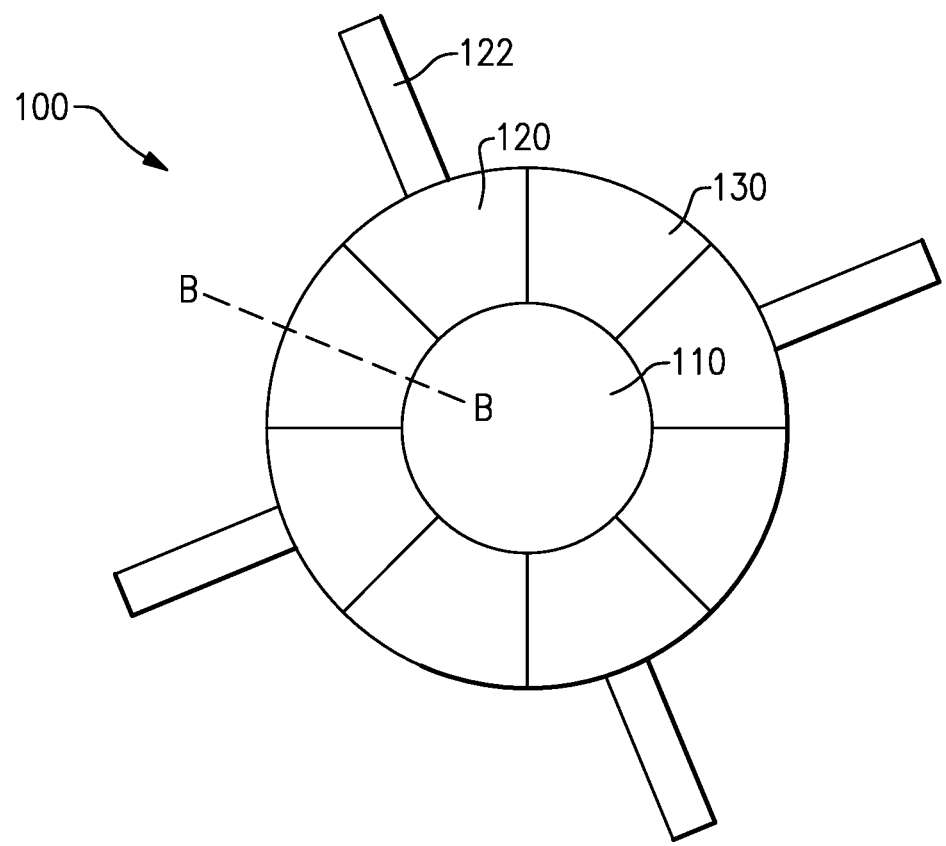
FIG. 2 schematically illustrates a forward facing view of a fan for the gas turbine engine of FIG. 1.

With continued reference to FIG. 1, FIG. 2 illustrates a highly schematic forward view of a fan section 100 for a gas turbine engine, such as the fan section 22 of the gas turbine engine 20 illustrated in FIG. 1. While described herein with regards to a geared turbofan, it should be appreciated that the fan section 100 can be for any gas turbine engine, including a direct drive engine, a two spool geared turbofan engine, or a three spool engine. Unless explicitly stated otherwise, as used herein "axial" refers to an alignment with a longitudinal axis of the gas turbine engine 20 in which the corresponding component would be installed. Similarly, "radial" refers to an alignment with a radius extending normal to the longitudinal axis of the gas turbine engine 20 in which the corresponding component would be installed.

The fan section 100 includes a hub 110, with multiple platforms 120, 130 mounted to the hub 110. A portion of the platforms 120 have fan blades 122 protruding radially outward from the hub 110. The fan blades 122 have aerodynamic profiles, and rotation of the fan blades 122 drives airflow into the gas turbine engine 20 including the fan section 100. Due to physical constraints, in some engines the platforms 120 including fan blades 122 are spaced apart from each other via one or more spacer platforms 130 positioned circumferentially between the fan blades 122. The spacer platforms 130 include a contoured radially outward flowpath surface, but no blade is mounted to the spacer platform 130.

Some spacer platforms 130 utilize a carbon composite laminate structure to create a portion of the spacer platform 130. However, the material properties of the carbon composite laminate structure can cause an expected life cycle of the spacer platform 130 to be shorter than desirable when used to construct the entire spacer platform 130 due to the stress types and orientations that the spacer platform 130 is exposed to during standard operations.

With continued reference to FIG. 2, FIG. 3A schematically illustrates an axial cross section of a spacer platform 130 cut along cross sectional line B-B and FIG. 3B illustrates a radial cross section of a platform 210 of the spacer platform 130 cut along cross sectional line A-A. The spacer platform 130 includes multiple platforms 210, each of which is connected to one or more axially adjacent lugs 220. The platforms 210 are constructed of a carbon fiber laminate material, and include a tubular void 212 internal to the platform 210. The tubular void 212 extends a substantial majority of an axial length of the spacer platform 130 on the aftmost platform 210 and forward most platform 210. In some examples, the substantial majority is at least 80%. At each of the intermediate platforms 210, the void 212 extends the full axial length of the platform 210 with axially oriented openings at each end. In the illustrated example, the voids 212 are unfilled. In alternative examples, a lightweight filler material can be disposed within the void 212. By way of example, the lightweight filler material can include foam, chopped fiber compounds, discontinuous fiber compounds, thermoplastics, thermosets, metals, honeycombes, or any similar materials.

Figure 5:
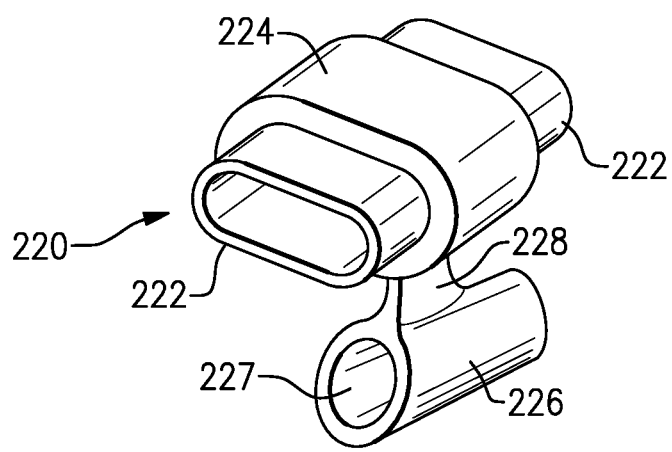
FIG. 5 schematically illustrates an isometric view of an exemplary lug section of a fan spacer.

Each of the platforms 210 is connected to at least one axially adjacent lug 220, via a lug post 222 that is received in a portion of the corresponding void 212. Each lug 220 includes a lug post 222 extending axially outward from each axial end of a platform portion 224. Radially inward of the platform portion 224 of the lug 220 is at least one connection portion 226. The connection portion 226 is connected to the platform portion 224 via a support structure 228 and facilitates connecting the spacer 130 to the hub 110. FIG. 5 schematically illustrates an isometric view of one of the lugs 220 isolated from the remaining structure. In the assembled configuration each of the platforms 210 and the platform portions 224 form a single cohesive flowpath surface facing radially outward. Some of the lugs 220 include a single connection portion 226, while others include two or more connection portions 226. The specific number of connection portions 226 on any given lug 220 depends on the particular configuration of the spacer platform 130. While the example lug 220 is illustrated with a single shape, it should be appreciated that the particular shape of a lug 220 can be changed to meet the particular requirements and functions of any given platform incorporating the lug 220.

Each of the connection portions 226 includes an axially aligned opening 227, and the axially aligned openings 227 are further aligned with each other. In order to mount the spacer 130 to the hub 110, a rod is passed through each of the connection features, and through at least one corresponding connection feature on the hub 110. The rod maintains the relative position of the spacer 130 and the hub 110.

Each of the lugs 220 is constructed of a single, solid material construction. In some examples, the lugs 220 are constructed of a metal material, such as aluminum or titanium. In alternative examples the lugs 220 can be a non-metal material and can be additively manufactured or milled according to any desired specification.

In order to maintain the proper connection between the lugs 220 and the platforms 210, and adhesive can be applied to the lug posts 222 and/or the interior surface of the void 212 prior to assembly of the spacer 130. Once assembled the adhesive is allowed to cure fully connecting the lugs 220 to the adjacent platforms 210. In alternative examples, alternative bonds, wraps, or fasteners can be utilized to enhance or maintain the connection between the lugs 220 and the platforms 210.

Figure 4:
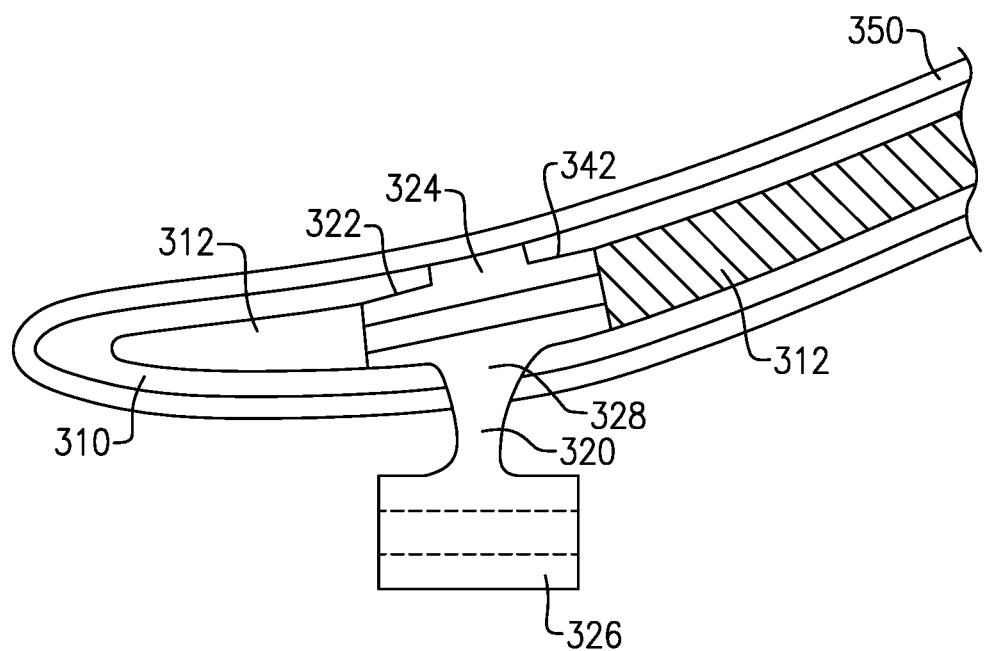
FIG. 4 schematically illustrates a partial view of a forward section of the fan spacer of FIG. 3 with an optional carbon fiber wrap layer.

With continued reference to FIGS. 2, 3A and 3B, FIG. 4 schematically illustrates a zoomed in view of an end portion of one such alternative. As described with regards to the previous example, a glue, or other adhesive, is positioned at contacting surfaces 342 between a post 322 and an interior of a void 312. In addition to the adhesive, a carbon fiber wrap 350 is positioned around the platforms 310 and at least the platform portion 324 of the lugs 320. In the example of FIG. 4, the carbon fiber wrap 350 does not extend along the support 328 and the connection portion 326 of the lug 320. In alternative examples, the carbon fiber wrap 350 can cover the entirety of the lug 320, in addition to the entirety of the platforms 310.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A multi-piece fan spacer for a gas turbine engine comprising:
at least one lug comprising a platform portion, a connection portion radially inward of the platform portion, and a support connecting the platform portion to the connection portion, wherein each platform portion includes at least one axially extending post, the at least one axially extending post being received in a void of an adjacent platform; and
a plurality of platforms, each of said platforms being connected to at least one axially adjacent platform portion.

2. The multi-piece fan spacer of claim 1, wherein each of said lugs is a single material distinct from a material of the plurality of platforms.

3. The multi-piece fan spacer of claim 2, wherein each at least one lug is the same non-composite material.

4. The multi-piece fan spacer of claim 2, wherein the single material is a non-composite material comprising one of aluminum and titanium.

5. The multi-piece fan spacer of claim 1, wherein each platform in said plurality of platforms comprises a laminate material structure.

6. The multi-piece fan spacer of claim 5, wherein each platform comprises an internal void extending at least a substantial majority of an axial length of the platform.

7. The multi-piece fan spacer of claim 6, wherein the internal void of each platform is at least partially filled, and a fill material is distinct from the laminate material.

8. The multi-piece fan spacer of claim 1, further comprising an adhesive bond connecting a surface of said at least one axially extending post to an interior surface of the void.

9. The multi-piece fan spacer of claim 1, further comprising a carbon fiber wrap disposed about an exterior surface of said lug and said plurality of platforms.

10. The multi-piece fan spacer of claim 9, wherein said carbon fiber wrap maintains a relative position of each of said lug and said plurality of platforms.

11. The multi-piece fan spacer of claim 1, wherein the connection portion comprises a plurality of axially oriented holes configured to receive a single fastener rod.

12. The multi-piece fan spacer of claim 1, wherein the at least one lug comprises a plurality of lugs.

13. A method for assembly of a fan section of a gas turbine engine comprising:
　　disposing at least a first spacer platform between adjacent fan blade platforms, wherein the at least a first spacer platform comprises at least one lug including a platform portion, a connection portion radially inward of the platform portion, and a support connecting the platform portion to the connection portion and a plurality of platforms, each of said platforms being connected to at least one axially adjacent platform portion; and
　　receiving at least one post extending axially from the platform portion in a void of an adjacent platform.

14. The method of claim 13, further comprising connecting the at least one spacer platform to a fan engine hub by passing a rod through each of the connection portions and at least one corresponding connection feature of the hub.

* * * * *